July 10, 1923.
G. HENLEY
VEHICLE SHOCK ABSORBER
Filed May 10, 1921
1,461,091
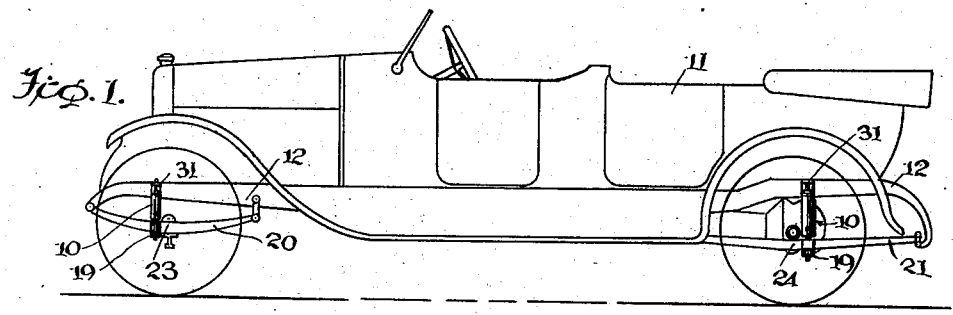
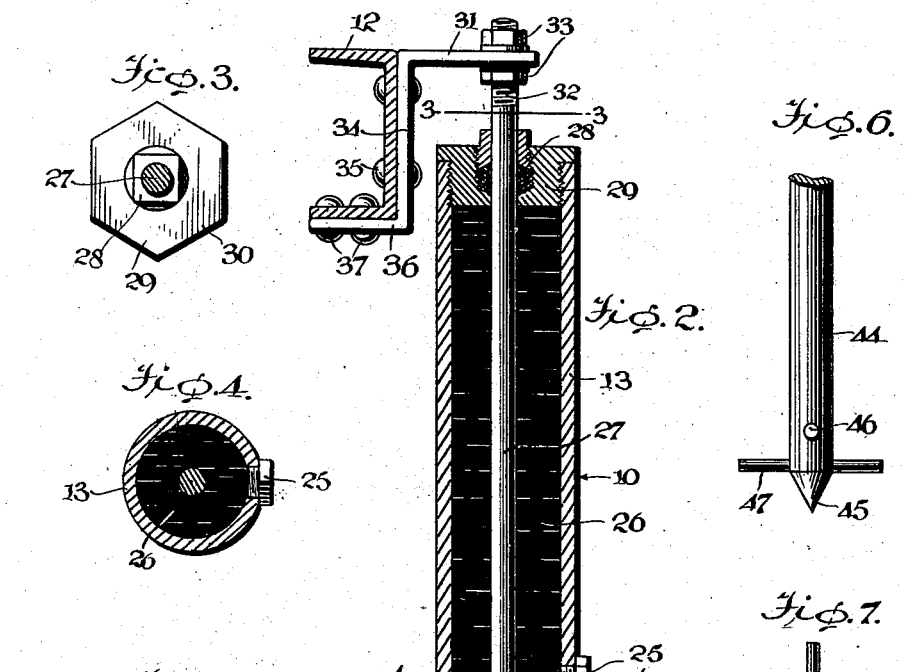
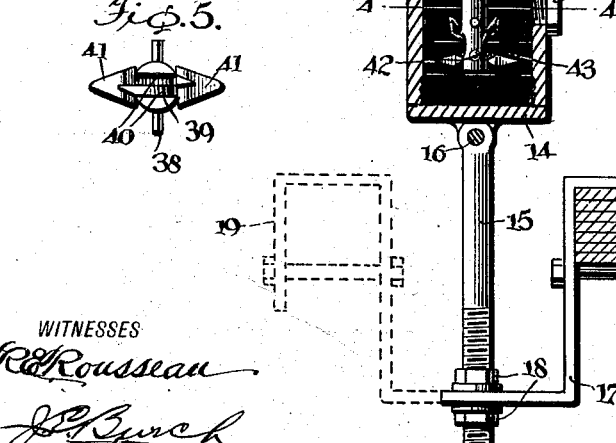
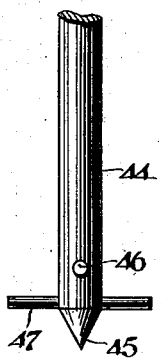
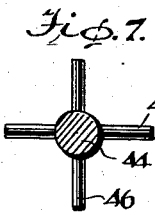
WITNESSES
INVENTOR
George Henley,
BY
ATTORNEYS Patented July 10, 1923.

1,461,091

UNITED STATES PATENT OFFICE.

GEORGE HENLEY, OF EDENBURG, PENNSYLVANIA.

VEHICLE SHOCK ABSORBER.

Application filed May 10, 1921. Serial No. 468,416.

*To all whom it may concern:*

Be it known that I, GEORGE HENLEY, a citizen of the United States, and a resident of Edenburg, in the county of Lawrence and State of Pennsylvania, have invented certain new and useful Improvements in Vehicle Shock Absorbers, of which the following is a specification.

My invention has reference to shock absorbers, and more especially to those adapted for application to vehicles such as automobiles, carriages and wagons, especially spring farm wagons so as to absorb shocks and vibration incident to rebound and recoil after striking a protuberance or bump or running into a rut or depression, when after downward movement of the body with respect to the wheels, permitted by the usual spring suspension, the body will move upwardly or rebound with resultant jarring of the occupants, or perhaps spilling or dumping out the contents of the vehicle in the case of automobiles and carriages, and of spring farm wagons, and particularly the latter of that type which are constructed to allow spring movement freely between the body and the running gear for use in traveling over rough roads or hilly country.

Further, an important object of the invention is to provide a shock absorber which is especially adaptable for use on automobiles in connection with the front and rear springs, which may be equally as well applied to the various types of automobile construction in a similar and effective manner and which so absorb the shocks due to rebound or recoil that jarring will be substantially eliminated and shocks due to rebound or recoil being so absorbed as to offer resistance to the movement of the body of the automobile or other vehicle vertically in either direction and especially upwardly, while also preventing sudden checking of the movement such as would tend to precipitate an occupant or the contents.

A further object of the invention is to provide a shock absorber of the class described, in which the usual riding the waves sensation sometimes experienced even on smooth and level surfaces, is absent, the invention also embodying a novel shock absorber and method of checking and absorbing momentum and shocks by the employment of a fluid or semi-fluid mass arranged within a cylinder so as to resist the movement of a plunger therein without a plunger or piston head as usually employed, but having means of a novel type such that the upward movement of the plunger will be subject to the greatest friction or resistance and in such a manner that said resistance will be constantly and gradually increased in opposite directions instead of uniformly continuing and thus obviating a sudden checking movement while gradually absorbing the shocks due to the constantly and gradually increasing resistance, said resistance being produced by circulation of said fluid or semi-fluid mass within the cylinder caused by the action thereof upon the plunger and the tendency to create a suction or vacuum behind the latter in moving upwardly, as well as the frictional resistance due to the circulation of said mass and between the same and the internal wall of the cylinder, said mass being such as to constitute a lubricant to maintain the parts in a condition of maximum efficiency and insure durability and wear for a quite indefinite period, said mass being composed of a mixture of novel character.

Other and further objects of my invention will become readily apparent to persons skilled in the art, from a consideration of the following description when taken in conjunction with the accompanying drawings, wherein—

Figure 1 is a side elevation of a vehicle, shown in the form of an automobile, having the improved shock absorbers applied thereto.

Figure 2 is an enlarged vertical sectional view centrally and longitudinally of one of the shock absorbers, applied to the body of the vehicle through the medium of the side member of the chassis or frame and a spring.

Figure 3 is a horizontal sectional view taken on the line 3—3 of Figure 2.

Figure 4 is a horizontal sectional view transversely of the device taken on the line 4—4 of Figure 2.

Figure 5 is a detail of the plunger and the feathering projections or flukes carried thereby to control the action of the plunger and thus of the device in combination or co-operation with the relatively fluid or semi-fluid mass contained in the cylinder.

Figure 6 is a detail in fragmentary side elevation showing another form of plunger, and Figure 7 is a plan view of the device as shown in Figure 6.

Referring to the drawings, in detail, in which like reference characters designate corresponding parts throughout the several views my improved shock absorber generally designated at 10 in Figure 1 of the drawings is shown applied to a vehicle in the form of an automobile 11, the body portion of which is mounted upon the chassis or frame having the side bars or members 12 of the usual channel-shaped cross section. The devices are shown applied between the front and rear springs and the frame, so as to check the upward movement of the latter with respect to the axles and wheels, thus absorbing shocks incident to recoil in traveling over uneven surfaces, that is, when striking a hump or projection or when striking a depression or rut. While the device is shown applied to an automobile, the construction illustrated in the preferred form, and capable of such minor changes in construction and details, as fall within the scope and spirit of the hereinafter appended claims, may be applied to other uses, and particularly to automobiles, carriages and wagons, the latter especially of the type used in rural districts on farms. The device will be described in detail and its application to an automobile in the manner shown in Figure 1 of the drawings will thus be made understood and apparent.

As illustrated, the device is embodied in the form of a comparatively long cylinder or casing 13 of sufficient length and breadth to accord with the use to which the device is put, the normal diameter on an average size automobile being about from one and one-quarter to one and one-half inches and the length about eight inches. While the cylinder is preferably of metal and the wall thereof is of sufficient thickness to resist pressure within and capable of sustaining the jar or shock absorbed by the device, yet it is comparatively light, small or compact, neat and attractive in appearance, strong and durable in use, inexpensive to manufacture and capable of application to various vehicles without particular modification.

At its lower end the cylinder 13 is provided with a bottom wall or closed end 14 formed integral therewith so as to close said end to which pivotal connection is made with a threaded shank or bolt 15, as indicated at 16. For this purpose, the lower end of the cylinder or bottom wall may be provided with an apertured ear receiving spaced apertured ears or furcations formed by an enlarged bifurcated upper end of the shank or vice versa, receiving the transverse or diametrical pivot pin as shown. The shank 15 is connected to one part of the vehicle or device to which the invention is applied, and as shown, its lower end is threaded for connection with a right angular bracket 17 the latter being apertured for this purpose so as to receive the threaded end of the shank and having lock nuts 18 threaded on said shank above and below the apertured portion of the bracket which latter is made of sufficient strength to resist the strain imposed thereon.

The bracket is provided with a horizontal portion connected to the shank and a vertical portion extended upwardly therefrom and provided with an overhanging or U-shaped portion 19 designed to be shifted at either side as shown in dotted and solid lines in Figure 2 of the drawings for attachment to the front or rear springs 20 or 21, and clamped by bolts 22. While all of the leaves of the spring may be retained, it has been found preferable to remove one or two of the leaves as best suited to properly support the body and absorb the shocks without weakening the structure. At the front, the bracket would extend to the inside edge, owing to the peculiar construction of automobiles of known types, and at the rear will extend to the outside for connection with the spring. The devices are applied at both sides in front of the front axle 23 and in rear of the rear axle 24, thus giving uniformity of action at the front and rear of the body or chassis with respect to both axles and all four wheels, instead of providing the same merely at the front or rear, in such a manner as to create a leverage tending to cause movement at one end only, that is at the front or at the rear with the result of sudden checking movement and precipitation of the occupants or contents as above outlined.

The cylinder 13, preferably near its lower end is provided with a filling opening for charging the same, said filling opening being closed by a screw threaded plug 25.

The cylinder is charged or filled with a fluid or a fluid plastic mass consisting of a mixture, the composition of which is of particular importance in connection with the features of the device as will be further pointed out. This filling or mass designated at 26, consists of graphite and a hard grease, such as cup grease, which serves as a binder for the thoroughly distributed and intermixed mass composed of the following proportions viz: 8 parts graphite; and 2 parts cup grease or substantially 80% graphite and 20% grease, the limits of proportions being preferably 75% graphite as a minimum and 15% grease as a maximum, the proportions necessarily varying with the climatic conditions, the load and other features, as it is throught will be understood. This mixture or mass is thoroughly combined and preferably applied in such condition but may be independently applied and may be compressed to remove excess oil and moisture. One of the particular advantages of the mass or mixture as stated, consists in its lubricating qualities and its smooth and uniform carbonated quality, in which the grease serves to form a binder and lubricant, which will maintain its pliable or fluid like condition as a mass or mixture, without coagulating or congealing when subjected to cold temperatures or softening to any appreciable degree at least in warmer climate or temperature, thus maintaining the proper consistency as to furnish the proper internal resistance between it and the plunger of the device to be hereinafter more particularly described, in addition to the suction or vacuum effect produced beneath said plunger when moving upwardly and the constant circulation of the mass when the device is acting to absorb shocks in either direction and especially upwardly, when the friction between the circulating medium and the inner surface of the cylinder will result in additional resistance to the upward movement of the plunger, such that said resistance is increased or decreased constantly until the shocks are absorbed or allayed in opposite directions and especially upwardly. It is thought that the graph of the resistance in either direction will be readily understood without illustration in view of the fact that the same is represented by a straight line gradually and constantly increasing in one direction and decreasing in the other. In traveling in the same path but in opposite directions, the graph in effect would produce a cross with the upward resistance greater than the downward resistance, as it is thought will also subsequently appear. I have tested known compositions, consisting of oils or other similar fluids, glycerine, fibre or mixtures thereof, granular material, lead, sand, sawdust, or a viscous, highly viscous or dough-like mixture of a thin and non-flowing nature, but have found the same objectionable. This is also true of a composition of talc and soap which is of a thick and non-spreading character somewhat pulverescent in nature and having an abrasive tendency while also losing its moisture and becoming dry and non-fluid-like and lacking in lubricant so as to prevent proper movement or as in some of the mixtures presented, permitting too free a movement and causing insufficient resistance due to the viscous rigidly coherent or non-coherent pulverulent mass as stated, or its lack of density as a fluid medium. In the use of the terms "fluid" or "semi-fluid" mass, reference is had to a substance, the particles of which are readily separable, the same consisting of graphite and hard or cup grease as stated, both forming a lubricant of efficient character and having fluid properties in that the same may be circulated or moved about as the plunger or piston rod reciprocates in the cylinder, the fluid quality at least extending to the property to so act under pressure, resistance, or compression.

The plunger or piston rod is designated at 27 and though it may be of any suitable cross section it is preferably round and of comparatively small diameter, to be determined by the amount of resistance to be produced due to the internal disturbance and friction as above set forth. This rod operates through a packing gland 28 in the upper end of the cylinder, said packing gland being mounted axially in a screw threaded plug or the like 29 engaging the upper end of the cylinder and preferably provided with a wrench engaging surface or head 30 in order to facilitate application and removal thereof, and to permit adjustment of the pressure of the filler or contents of the cylinder in conjunction with the bottom plug above referred to in the event the latter is so provided. By reason of the construction just explained, the escape of the contents is effectively prevented. The upper end of the rod is connected to a double right angular or substantially Z-shaped bracket 31, the horizontal portion of which at the upper end thereof is apertured to receive the threaded end 32 of the rod, which is engaged by lock nuts 33 above and below the engaged portion of the bracket in order to secure a firm attachment. It is of course to be understood that the bracket is of sufficient strength to take the jars and shocks without injury thereto, and as illustrated, the vertical portion 34 of the bracket is riveted or otherwise secured to the web of the frame member 12, as indicated at 35 and likewise the lower horizontal portion 36 which extends beneath the lower flange or wing of said frame member, is also riveted or otherwise secured thereto as indicated at 37. The exact position of the device as illustrated is vertical, but such position will vary in connection with different types of cars, since the relative locations of the parts to which the device is attached varies in the different types.

In order to absorb the shocks and jars due to recoil or rebound as above explained, the plunger or rod 27 is adapted for movement within the cylinder through the mass or filler contained therein and in addition to the ordinary friction produced between the surface of the rod and said material, there is also a tendency to produce a suction or vacuum on the upward stroke of the rod as the body moves upwardly with respect to the axles, irrespective of the position of the device at the front or rear of the car or vehicle, and the friction between said filler or mass and the inner surface of the cylinder resulting from the circulation or flowing of said material as displaced by the movement of the plunger. Additional means is also provided on the rod for increasing the resistance and friction between the same and the filler or to increase the resistance to the movement of the plunger or piston rod within the cylinder and through the mass contained therein, said means being arranged at right angles in order to produce uniform resistance at diametrically opposite sides. In the form shown in Figures 2 and 5, the rod 27 is provided with a pin or cross member 38 extending through and across the same at right angles to the axis thereof and projecting from the surface thereof, said member being also spaced from the free or lower end of the rod. The other means is arranged at right angles to the cross member 38 and as illustrated, the end of the rod beyond the cross member is split or bifurcated as indicated at 39 to pivotally receive the reduced inner end portions 40 of the flukes 41, which latter are tapered, both in width and thickness. They are mounted upon the transverse pivot 42 parallel to the cross member or pin 38 and engaged between the apertured portions or ears at the lower end of the rod, which latter is recessed at diametrically opposite sides, as indicated at 43, in order to accommodate the projections or flukes 41 when folded upwardly against the rod. This movement will automatically take place during the downward movement of the plunger or piston rod, causing the flukes to fold or collapse during said downward movement and to open out or expand in the upward movement, the feathering action thus produced resulting in increased resistance on the upward movement of the plunger when the body or chassis is moving upwardly due to the recoil or rebound after striking an obstruction or depression. Thus further resistance will be offered to the upward movement than to the downward movement, the friction gradually and constantly increasing in the upward direction and also in the downward direction, but to a greater degree in the upward direction of the plunger for the purposes set forth. The construction described has a particular cooperation with the filler, in that the parts are lubricated and therefore kept in proper condition, in addition to serving the function described without injury to the parts and in a manner which is not possible with the other fillers. Thus, particular novelty resides in the method and mixture employed.

Another form of plunger or piston rod is shown in Figures 6 and 7 of the drawings, the piston rod being designated at 44 and preferably having a tapered lower end or free extremity 45, the tapered formation being produced in conical, flattened or other shape. The obstruction or resistance means forming projections on the rod, consists of pins 46 and 47 arranged at right angles to each other and extending through the rod parallel to each other and at right angles to the axis of the rod. The operation of this device is the same as that heretofore described, except as to the feathering action which has been already explained. It will also be apparent that the device will permit full freedom of movement and spring action at all times between the body, and wheels and axles, and that it will check all shocks due to rebounds or recoils, in addition to stopping side sway. In this manner the uncomfortable "riding the waves" sensation experienced especially when riding over rough roads will be eliminated, and destruction or breaking of the spring and connections prevented. Another important item is also evidenced by the fact that the spring can be made with a less number of leaves without weakening the suspension structure.

In view of the foregoing, it is thought that the operation of the device will be readily understood and in view of its simplicity and practical value, that it will readily recommend itself to those skilled in the art.

Having thus fully described my invention what I claim is:—

1. In a shock absorber for automobiles, a cylinder, a rod-like plunger operating therein, a mixture of graphite and cup grease in said cylinder, right angularly related friction and resistance producing projections on the plunger, and means to connect one end of the cylinder and the plunger at the opposite end to independently movable parts of the automobile, certain of said projections of the plunger, comprising flukes pivoted to the plunger and tapered in width and thickness toward their free ends, said flukes being adapted to open in one direction of movement of the plunger and to close against the plunger upon opposite movement thereof.

2. In a shock absorber, a plunger, a pair of pointed elements pivotally connected to the plunger adjacent its one end and adapted for swinging movement, and adapted for transverse swinging movement with relation to the longitudinal axis of said plunger for the purpose described.

3. In a shock absorber, a plunger, a pair of pointed elements pivotally connected to the plunger adjacent its one end and adapted for swinging movement, and adapted for transverse swinging movement with relation to the longitudinal axis of said plunger for the purpose described, and means for limiting swinging movement of said elements in either direction.

4. In a shock absorber, a plunger, a pair of pointed light elements pivotally connected to said plunger, the pivotal axis being at right angles to the longitudinal axis of the plunger, and said elements having co-operative extensions adapted to limit the swinging movement thereof in either direction.

5. In a shock absorbr, a plunger having a transverse slot occurring adjacent its one end, a pair of retarding elements, each element having a portion thereof disposed in said slot of the plunger, and a pivoting member extending through said plunger and elements whereby to support the retarding elements for swinging movement with relation to the plunger, said pivoting means being disposed transversely to the longitudinal axis of the plunger.

6. In combination, a cylinder filled with plastic material, a plunger movable within said cylinder, and a plurality of retarding elements pivotally secured to said plunger adapted to move for retarding movement of said plunger in either direction.

7. In combination, a cylinder filled with plastic material, a plunger movable within said cylinder, a plurality of retarding elements pivotally secured to said plunger and adapted to move for retarding movement of said plunger in either direction, and means for limiting the movement of said retarding elements.

8. A filler for shock absorbers of the character described, comprising graphite and a binder of hard grease.

9. A filler for shock absorbers of the character described, comprising eight parts of graphite and two parts of grease.

10. In a shock absorber, an elongated cylinder having closed ends and pivoted means of attachment at one end, a rod of relatively small diameter operating through one end thereof freely and having means of attachment at its outer end, the inner end being free and spaced from the inner surface of the cylinder, lateral projections on the rod at its free end and a mass in the cylinder and entirely filling the same, said mass consisting of graphite and a binder of hard grease, to operate in the manner set forth.

GEORGE HENLEY.